Figure 1:
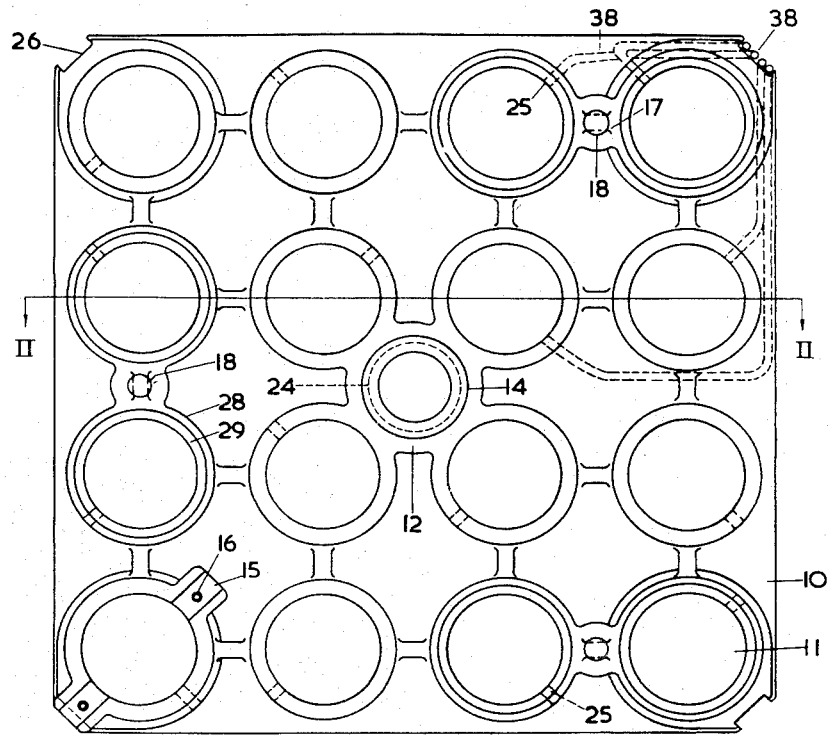

Aug. 29, 1961   E. LONG   2,998,368
FUEL ELEMENT CHARGING/DISCHARGING GEAR FOR NUCLEAR REACTORS
Filed June 11, 1956   2 Sheets-Sheet 1

Aug. 29, 1961     E. LONG     2,998,368

FUEL ELEMENT CHARGING/DISCHARGING GEAR FOR NUCLEAR REACTORS

Filed June 11, 1956     2 Sheets-Sheet 2

United States Patent Office 2,998,368
Patented Aug. 29, 1961

2,998,368
FUEL ELEMENT CHARGING/DISCHARGING GEAR FOR NUCLEAR REACTORS
Everett Long, Culcheth, England (% United Kingdom Atomic Energy Authority, Bedford Chambers, Covent Garden, London W.C. 2, England)
Filed June 11, 1956, Ser. No. 590,528
Claims priority, application Great Britain June 9, 1955
5 Claims. (Cl. 204—193.2)

This invention relates to fuel element charging/discharging gear for nuclear reactors and it provides a charging guide for use in association with a moderator structure for a nuclear reactor.

In order to reduce the number of access holes between the outside of a nuclear reactor and its moderator structure the design of the reactor usually provides means whereby the fuel element channels in the moderator structure are grouped and can be reached by charging gear passing through single access holes associated with each group, each hole being located symmetrically relative to its respective group of fuel element channels. A moderator structure is however susceptible to dimensional changes due to thermal and irradiation growths within its lifetime and is also easily damaged by impact with any hard objects. Accordingly, means are required to guide fuel elements in the course of their charging and dischargings throughout the lifetime of the reactor so that they pass readily from their channels in the moderator structure to charging gear and vice versa and without impact or wear on the moderator structure.

According to the invention a charging guide for use in association with a moderator structure for a nuclear reactor comprises a body defining a symmetrical array of parallel channels, means providing three point support of the body against the face of a moderator structure, a single point locating means for locating the body on the moderator structure, sliding keying means extending radially relative to said point locating means and locating means for fuel element charging/discharging gear giving access to said array of channels.

Figure 2:
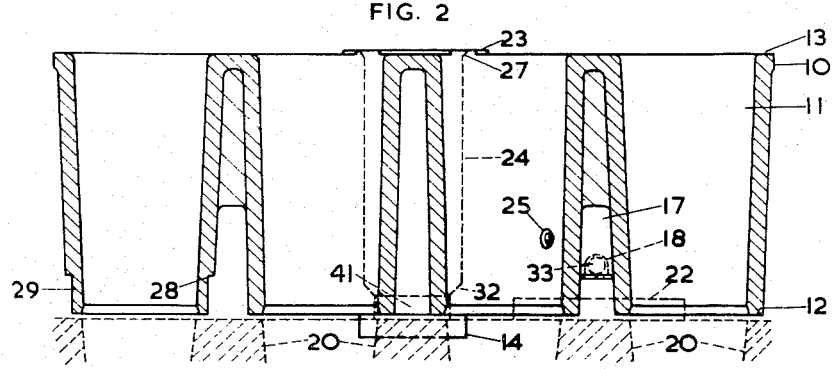
Figure 3:
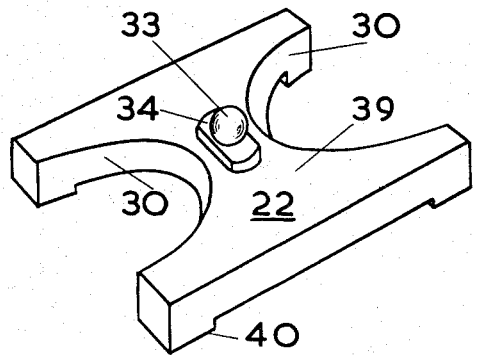
Figure 4:
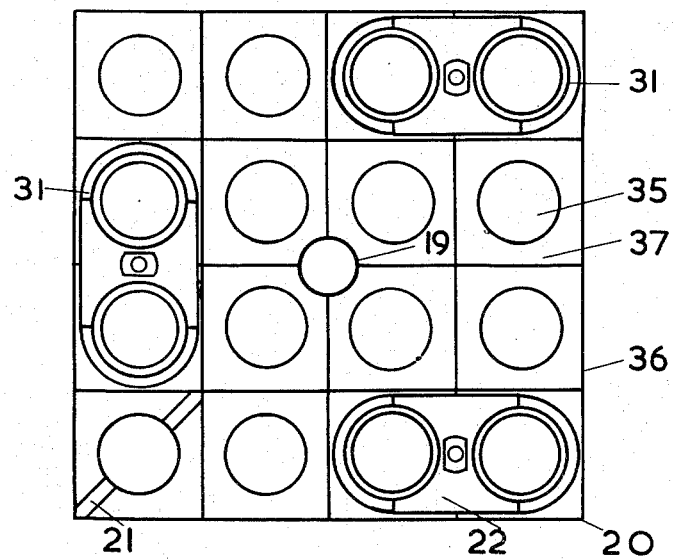

Guides according to the invention fulfill multiple functions. They provide individual guide channels into each fuel element channel in the moderator structure so that the elements can be induced to enter and leave their channels without damage to themselves or to the moderator structure; they provide throats between the smooth fuel element channels and the void beyond the ends of the moderator structure; they provide ballast when installed on the top face of a vertically orientated reactor, they provide a structural device by which access can be obtained to sample the flow of coolant along the fuel element channels and they provide means to assist in the operation of the reactor control rods. An embodiment of the invention will now be described with reference to the accompanying drawings wherein:

FIG. 1 is an inverted plan view.
FIG. 2 is a sectional elevation on the line II—II of FIG. 1.
FIG. 3 is a perspective view of a support for the guide.
FIG. 4 is a plan view of the top of a moderator structure formed to accommodate the guide.

Referring to FIGS. 1 and 2 a nodular cast iron body 10 is formed to have a symmetrical array of sixteen channels 11 extending between opposite sides 12, 13 of the body 10. The side 12 is designed to abut a moderator structure 20 (FIG. 4) and it has a boss 14 and a bar 15. The boss 14 serves as a single point locating means for the body 10 and rests in a mating hole 19 (FIG. 4) in the moderator structure 20. The bar 15, which extends in a radial direction from the centre of the boss 14, is secured by bolts 16 so as to be slidable in a keyway 21 (FIG. 4) cut in the moderator structure 20. Three webs 17 carry sockets 18 to provide a three-point support of the body 10 against the face of the moderator structure through ball supports 22 as shown in FIG. 3. On the side 13 of the body 10 there is a boss 23 and associated channel 24 for locating with the snout of charging/discharging gear.

Each channel 11 has a hole 25 giving access to the channels by open-ended gas sampling pipes 38. The corners of the body 10 have cut-away parts 26 allowing the pipes 38 to be passed from the underside to the top side of the body 10. Those channels 11 which are on either side of the sockets 18 have cut-away parts 28 to provide bosses 29 which are designed to locate loosely in semi-circular open ends 30 (FIG. 3) of the supports 22.

In FIG. 2 the locating of the moderator structure 20 relative to the body 10 is shown. A section of the channel 24 is also shown. The section includes an inclined face 27 for locating the charging snout of fuel element charging/discharging gear and an inclined face 32 for supporting a control rod (which normally moves in the channel 24) when detached from its winding mechanism to allow the introduction of the snout referred to above and also to take impact to break a shear pin in the control rod should the control rod inadvertently fall freely. The channels 11 taper from five inches at the face 12 to 5.92" at the face 13. They are eleven inches long. The distance between centres of the channels 11 is conventionally of the order of eight inches and is, of course, governed by the spacing of the fuel element channels in the reactor.

In FIG. 3 the ball support 22 is shown having semi-circular open ends in the base 39 which locate with bosses 29 associated with the channels 11. A ball 33 is welded on a raised part 34 which is in turn welded to the base 39. The ball 33 locates with the sockets 18 (FIG. 2). The support 22 has feet 40 and the support rests on rings 31 spigotted in the top face 37 of the moderator structure 20 in a manner shown in FIG. 4.

FIG. 4 shows a group of sixteen graphite blocks 36 which are part of the moderator structure 20. Each block 36 has a fuel element channel 35 and centred on each sixteen blocks there is a hole 19. The hole 19 serves as a control rod hole and also serves to locate the boss 14 of the body 10. As the hole 19 is located relative to the fuel element channels 35 so is the channel 24 of the body 10 similarly located and hence the snout of charging/discharging gear when inserted in the channel 24 is located relative to the sixteen fuel element channels it is designed to service. Three supports 22 are provided for each body 10, thus distributing the weight of the body (which may be about 600 lbs.) over six vertical columns of graphite blocks through the rings 31.

Both in the construction (due to tolerance build-up) and in the lifetime of the graphite moderator structure it is to be expected that the top faces 37 of the blocks 36 will take up different levels and there will also be differential thermal movements between graphite blocks 36 and supports 22. In the course of these movements the body 10 will remain stable by reason of its 3-point support and so long as the axes of the channels 35 are more or less fixed and growth and movement takes place about these fixed axes then the channels 11 will always be available to service the channels 35. The body 10 is prevented from rotating by the keyway 21 whilst differential expansion between the moderator structure 20 and body 10 is accommodated by the bar 15 attached to the body 10 but slideable in the keyway.

The arrangement of sixteen channels permits a central locating hole (hole 19) in which a central pillar can be located having a pivoted chute which can traverse the sixteen channels 35 by rotation on three fixed radii:

first the radius determined by the four centre channels, second that determined by the eight centre-side channels and third that determined by the four corner channels.

I claim:

1. A charging guide for use in association with a moderator structure for a nuclear reactor comprising a body defining a symmetrical array of parallel channels, means providing three point support of the body against the face of a moderator structure, a single point locating means centrally disposed on said body for locating the body on the moderator structure, sliding keying means mounted on said body and extending radially relative to said point locating means and locating means disposed in said body for fuel element charging/discharging gear giving access to said array of channels.

2. A charging guide for use in association with a moderator structure for a nuclear reactor comprising a body defining a symmetrical array of sixteen parallel channels in the form of a square lattice, means providing three point support of the body against the face of a moderator structure, a central annulus on said body for locating the body on the moderator structure, sliding keying means mounted on said body for engaging with a slot in the moderator structure extending radially relative to said ring, and means defining a central channel co-axial with said annulus and penetrating through the body for fuel element charging/discharging gear giving access to said array of channels and for the movement of a control rod through said body.

3. A charging guide as claimed in claim 2 in which the channels are tapered, the smaller diameter being on that side of the body which abuts the moderator structure.

4. A charging guide as claimed in claim 2 in which each channel in said array has means defining a hole penetrating the wall of the channel and open-ended gas sampling pipes located in said holes.

5. In combination with a vertically orientated moderator structure for a nuclear reactor a charging guide as claimed in claim 2 in which each means providing three point support rests on two rings spigotted into the top of the moderator structure around two adjacent fuel element channels.

References Cited in the file of this patent

UNITED STATES PATENTS

| | | |
|---|---|---|
| 1,753,722 | Schaum | Apr. 8, 1930 |
| 2,739,773 | Rougemont | Mar. 27, 1956 |
| 2,756,859 | Steffen et al. | July 31, 1956 |
| 2,782,158 | Wheeler | Feb. 19, 1957 |

OTHER REFERENCES

Nucleonics, December 1956, page S. 23.